United States Patent [19]

Schmeidl

[11] Patent Number: 4,952,680

[45] Date of Patent: Aug. 28, 1990

[54] PREPARATION OF STABLE SOLUTIONS OF AZO DYES OF M-PHENYLENEDIAMINE BY REACTION WITH FORMIC ACID

[75] Inventor: Karl Schmeidl, Ludwigshafen, Fed. Rep. of Germany

[73] Assignee: BASF Aktiengesellschaft, Ludwigshafen, Fed. Rep. of Germany

[21] Appl. No.: 181,577

[22] Filed: Apr. 14, 1988

[30] Foreign Application Priority Data

Apr. 23, 1987 [DE] Fed. Rep. of Germany ....... 3713618

[51] Int. Cl.$^5$ ................... C09B 37/00; C09B 67/14; C09B 67/34; D21H 3/80
[52] U.S. Cl. ................... 534/676; 534/575; 534/576; 534/887
[58] Field of Search ............... 534/576, 676, 887, 575

[56] References Cited

U.S. PATENT DOCUMENTS

| | | | |
|---|---|---|---|
| 3,310,362 | 3/1967 | Fiess | 8/79 |
| 3,346,322 | 10/1967 | Finkenbauer et al. | 534/576 X |
| 3,696,089 | 10/1972 | Raue et al. | 534/576 |

FOREIGN PATENT DOCUMENTS

| | | | |
|---|---|---|---|
| 0036553 | 9/1981 | European Pat. Off. | 534/576 |
| 0046237 | 2/1982 | European Pat. Off. | 534/576 |
| 1355911 | 2/1964 | France | 534/576 |
| 2068684 | 8/1971 | France | 534/576 |

*Primary Examiner*—Floyd D. Higel
*Attorney, Agent, or Firm*—Oblon, Spivak, McClelland, Maier & Neustadt

[57] ABSTRACT

Stable solutions of azo dyes obtained by diazotizing and coupling m-phenylenediamine or derivatives thereof are prepared after the reaction has ended by treating the resulting reaction mixture with from 0.1 to 1.2 moles of formic acid, based on 1 mole of m-phenylenediamine, at from 60° C. to the boiling point of the reaction mixture.

2 Claims, No Drawings

PREPARATION OF STABLE SOLUTIONS OF AZO DYES OF M-PHENYLENEDIAMINE BY REACTION WITH FORMIC ACID

The present invention relates to a novel process for preparing a stable solution of an azo dye obtained by diazotizing and coupling substituted or unsubstituted m-phenylenediamine by treating the reaction mixture present at the end of the reaction with formic acid at elevated temperature.

Dyes of the vesuvin type are used in large amounts in the paper industry for producing yellow and brown colorings. Vesuvin dyes are azo dyes obtained by diazotizing and coupling m-phenylenediamine or alkyl or alkoxy derivatives thereof. They are generally not uniform dyes but mixtures of monoazo, disazo and polyazo dyes, since the diamine starting material and the products derived therefrom are not just singly but multiply diazotized and coupleable. Specific examples are dyes of Colour Index (C.I.) numbers 21,000 (C.I. Basic Brown 1), 21,010 (C.I. Basic Brown 4) or 21,020 (Basic Dye).

Unfortunately, vesuvin dyes tend to undergo undesirable reddening in the dyeing of paper in the acid range, which severely limits their possible uses.

It is an object of the present invention to provide a process whereby this defect can be eliminated.

We have found that this object is advantageously achieved with a process for preparing a stable solution of an azo dye obtained by diazotizing and coupling unsubstituted or $C_1$–$C_4$-alkyl- or $C_1$–$C_4$-alkoxy-substituted m-phenylenediamine where, after the reaction has ended, the resulting reaction mixture is treated with from 0.1 to 1.2 moles of formic acid, based on 1 mole of m-phenylenediamine, at from 60° C. to the boiling point of the reaction mixture.

The starting material for the azo dyes is unsubstituted or $C_1$–$C_4$-alkyl- or $C_1$–$C_4$-alkoxy-subs m-phenylenediamine. Preferably, the m-phenylenediamine is unsubstituted or substituted in the ring by methyl or methoxy.

The diazotization and coupling reaction is carried out in a conventional manner as described for example in EP-A-No. 36,553.

After the reaction has ended, the resulting reaction mixture is treated with from 0.1 to 1.2 moles, preferably with from 0.3 to 0.9 mole, of formic acid, based on 1 mole of m-phenylenediamine, at from 60° C. to the boiling point of the reaction mixture. The boiling point of the reaction mixture is in general about 108° C. Preferably, the heat treatment takes place at from 70° to 100° C., in particular at from 80° to 95° C. The heat treatment is advantageously carried out under atmospheric pressure. A temperature above the boiling point of the reaction mixture does not produce any further benefits.

The formic acid used for the treatment can be in pure form or conveniently in the form of the technical grade 85% strength by weight aqueous solution.

The treatment time extends in general over a period from 1 to 10 hours, preferably from 3 to 6 hours.

After the treatment has ended, the reaction mixture can be admixed with a water-miscible solvent, for example glycol or a glycol ether, such as diethylene glycol, dipropylene glycol, ethylene glycol monomethyl, monoethyl, monopropyl or monobutyl ether, or diethyleneglycol monomethyl, monoethyl, monopropyl or monobutyl ether, and then filtered. The use of diethylene glycol monobutyl ether (butyldiglycol) is preferred. The butyldiglycol can also be added prior to the treatment with formic acid. This does not effect the coloristic properties.

It proved to be the case that the dye solutions produced by means of the novel process no longer undergo reddening on use in paper dyeing in the acid range.

A further advantage of the dye solutions treated according to the invention is that, in addition, they are improved in purity of hue and shelf life, in particular as far as the preservation of the color strength is concerned.

The Examples which follow serve to illustrate the invention in more detail. The parts are by weight.

EXAMPLE 1

177 parts of m=phenylenediamine were dissolved in a mixture of 388 parts of acetic acid and 74 parts of water. 90 parts of neopentylglycol dinitrite were then added with cooling at below 23° C. From the end of the addition the reaction mixture was stirred for about 2 hours with a gradual warming to room temperature. (To perform a coloristic comparison with the end product, a sample was taken from the reaction mixture.)

54 parts of 85% strength by weight of aqueous formic acid were then added, and the reaction mixture was then raised in the course of about 2 hours to 95° C., maintained at that temperature for 1 hour and then cooled down.

A coloristic comparison of the dye solutions with and without formic acid treatment in the wet-end coloring of waste paper derived stock showed that the reddening in the acid range is significantly greater with the untreated sample than with the final, formic acid treated, sample.

EXAMPLE 2

Example 1 was repeated, except that the m-phenylenediamine was replaced by 200 parts of 1-methyl-2,4-diaminobenzene. A similar result was obtained in respect of the reddening effect.

EXAMPLE 3

177 parts of m-phenylenediamine were dissolved in 482 parts of 90% strength by weight aqueous acetic acid, the solution was cooled down to 10°–15° C., and 100 parts of neopentylglycol dinitrite were added with stirring in the course of 5 hours. The temperature was maintained below 23° C. by cooling. From the end of the addition the reaction mixture was stirred for a further 2 hours with the temperature coming back up to room temperature.

54 parts of 85% strength by weight aqueous formic acid were then added, the mixture was stirred for one hour, and samples were taken for comparison. The mixture was then heated to from 50° C. to 60° C., maintained at that temperature for half an hour and then raised to 90°–95° C. After 2.5 hours of stirring the mixture was cooled down to 30°–35° C. and clarified by filtration. There was no filter residue.

Compared with a sample of the heat-treated solution, a sample taken before heating gave a dull reddish brown in wet-end coloring. The red shift of the two dye solutions at pH 5 (as against wet-end coloring at pH 7) was appreciably stronger in the case of the untreated sample.

In addition, of the untreated samples taken for comparative purposes, one sample was stored at about 0° C.

for 2 months and another sample at room temperature again for 2 months. Similarly, two samples were taken from the heat-treated solution, one sample being stored at about 0° C. for 2 months and the other at room temperature again for 2 months. It was observed that wet-end coloring with the heat-treated solution revealed no difference between the samples stored at different temperatures. By contrast, using the samples not treated according to the invention in wet-end coloring revealed a difference in color strength: the color strength of the sample stored at room temperature was about 15% less than that of the sample stored in the cold; ie., the solution not treated according to the invention is not stable to storage and undergoes a marked loss of color strength even at room temperature.

EXAMPLE 4

177 parts of m-phenylenediamine were dissolved in 462 parts of 95% strength by weight aqueous acetic acid. 120 parts of neopentylglycol dinitrite were added with stirring at from 15° to 20° C. in the course of about 4 hours, during which it was ensured by cooling that the temperature of the reaction solution did not exceed the stated range. Stirring was continued for about a further hour, 54 parts of 85% strength by weight aqueous formic acid were then added, and the mixture was heated to 90° C. for 3 hours, cooled down and filtered.

The filtrate obtained comprised a mobile dye solution which was stable to storage. The wastewater from wet-end coloring was colorless. The shift in the brown hue toward red in wet-end coloring of waste paper stock at pH 5 (as against pH 7) was appreciably less than with the sample not heated together with formic acid. The treatment with formic acid also improved the purity of hue.

EXAMPLE 5

177 parts of m-phenylenediamine were dissolved in a mixture of 388 parts of acetic acid and 24 parts of water and reacted with 110 parts of neopentylglycol dinitrite at about 15°–20° C.

The mixture was subsequently stirred at about 20° C. for one hour, 54 parts of 85% strength aqueous formic acid were then added, and the temperature was then raised to 90° C. in the course of about 4 hours and maintained at that level for 1 hour. The mixture was then diluted with 50 parts of butyldiglycol, cooled down and filtered.

The filtrate comprised a dye solution stable to storage. The dye had high affinity for paper. Compared with a sample taken prior to the treatment with formic acid, the reddening in the acid range was significantly improved, as was the purity of hue.

EXAMPLE 6

177 parts of m-phenylenediamine were dissolved in a mixture of 362 parts of acetic acid and 24 parts of water and reacted with 110 parts of neopentylglycol dinitrite at about 15°–20° C. After one hour of subsequent stirring at about 20° C., 81 parts of 85% strength by weight aqueous formic acid were added, and the mixture was heated at 108° C. (boiling under reflux) for 3 hours. The mixture was then diluted with 50 parts of butyldiglycol, cooled down and filtered.

EXAMPLE 7

177 parts of m-phenylenediamine were dissolved in a mixture of 335 parts of acetic acid and 34 parts of water and reacted with 110 parts of neopentylglycol dinitrite at about 15°–20° C. After one hour of subsequent stirring at about 20° C., 107 parts of 85% strength by weight aqueous formic acid were added, and the mixture was heated similarly to Example 5. The mixture was then diluted with 50 parts of butyldiglycol, cooled down and filtered. There was no filter residue.

The dye obtained had similar properties to that in Example 6. The brown was even less reddish. The purity was further enhanced.

I claim:

1. A process for preparing a stable solution of an azo dye obtained by diazotizing and coupling unsubstituted or $C_1$–$C_4$-alkyl- or $C_1$–$C_4$-alkoxy-substituted m-phenylenediamine in acetic acid, which comprises, after the reaction has ended, treating the resulting reaction mixture with from 0.1 to 1.2 moles of formic acid, based on 1 mole of m-phenylenediamine, at from 60° C. to the boiling point of the reaction mixture.

2. A process as claimed in claim 1, wherein the reaction mixture is treated with from 0.3 to 0.9 mole of formic acid, based on 1 mole of m-phenylenediamine.

* * * * *